Mar. 6, 1923.
C. G. CASHMAN
REAMER HEAD
Filed Apr. 5, 1919
1,447,922
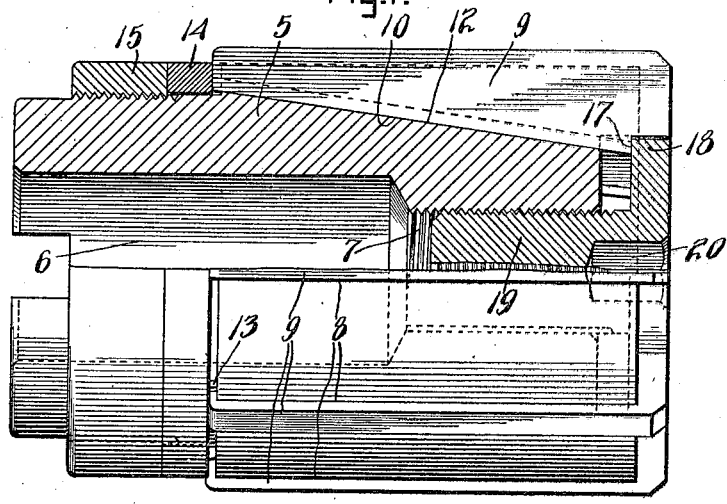
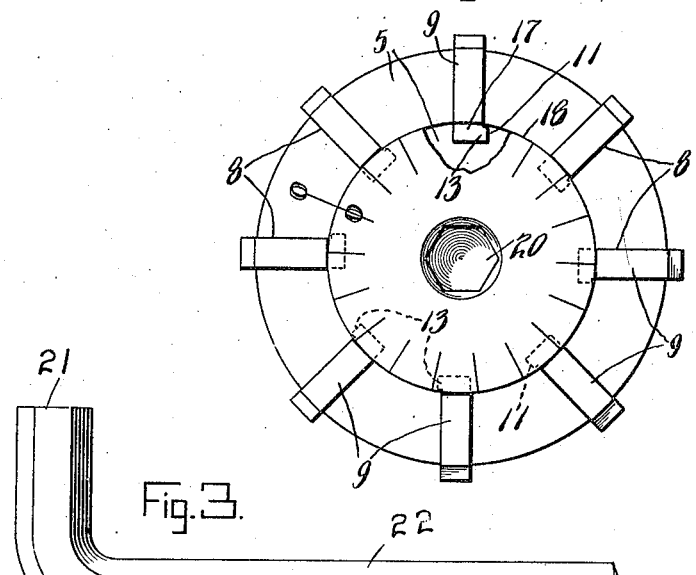
Inventor
Clarence G. Cashman Patented Mar. 6, 1923.

1,447,922

UNITED STATES PATENT OFFICE.

CLARENCE G. CASHMAN, OF WAYNESBORO, PENNSYLVANIA, ASSIGNOR TO CASHMAN TOOL COMPANY, OF WAYNESBORO, PENNSYLVANIA, A CORPORATION OF PENNSYLVANIA.

REAMER HEAD.

Application filed April 5, 1919. Serial No. 287,796.

*To all whom it may concern:*

Be it known that I, CLARENCE G. CASHMAN, a citizen of the United States, residing at Waynesboro, Franklin County, and State of Pennsylvania, have invented and discovered certain new and useful Improvements in Reamer Heads, of which the following is a specification.

My said invention relates to cutter and reamer heads and consists in the combinations and arrangements of elements hereinafter described and particularly set forth in the accompanying claims.

The purpose of the invention is to provide a cutter or reamer head of the radial, adjustable blade type having means simultaneously adjusting the several blades on an inclined surface between a pair of adjustable elements.

The invention has for its further purpose to provide a reamer blade adjusting device employing a minimum number of parts, to the end of simplicity of construction, and wherein the adjustment of the blades may be effected by a quick, simple, and easily performed operation.

Referring to the accompanying drawings which are made a part hereof and on which similar reference characters designate similar parts, Figure 1 is a side elevation of a reamer constructed in accordance with my invention with parts broken away to more clearly disclose the inner working structure, Figure 2, an end elevation of the same with a portion broken away to show the key portion of one of the cutters, and, Figure 3 a view of the wrench.

Referring to the said drawings, 5 represents the cylindrical reamer head which is provided with a large smooth bore 6 adapted to receive the machine spindle, (not shown) and a smaller threaded bore 7 for a purpose to be explained later.

The reamer head is constructed to be mounted on and revolved by a machine spindle or mandrel, and is provided on its outer surface with a plurality of longitudinal grooves or seats 8 arranged equidistant around the periphery thereof and adapted to receive the reamer blades 9. Said grooves or seats are formed with their bottom surfaces inclined downward from the rear to front as at 10 and of a greater width than the body of the groove to form an offset key-way 11 at said bottom. The blades 9 are provided on one side of their inclined surfaces 12 with a key 13 which is of a size to snugly fit in the key-way 11 but have a sliding adjustment therein. The inner ends of the several blades bear against a collar 14 loosely mounted on the reamer head and confined in an adjustable manner by means of a ring nut 15 screwed on a threaded portion 16 of the member 5. The outer ends of the blades are notched as at 17 to receive the circumferential portion 18 of the head of a threaded member 19 which fits in the small threaded bore 7 referred to. This member 19 is provided with a socket 20 adapted to receive end 21 of the wrench shown at Fig. 3 beginning the loosening or completing the tightening movement or the end 22 in intermediate movements when great stress is not required but only causing the movement of the several cutters. It is apparent that the cutters may be easily spread by screwing both the nut 15 and the member 19 to the left whereas the reverse motion will retract the blades.

It will be obvious to those skilled in the art that various changes may be made in the details of construction and arrangement of parts without departing from the spirit of my invention, and that the operative edge of the blades, whether smooth or serrated for threading is not material, and therefore I do not wish to be limited to any particular features except as may be required by the claims.

Having thus fully described my said invention, what I claim as new and desire to secure by Letters Patent is:

1. A cutting and reaming tool comprising a body portion having a large, smooth bore adapted to receive the machine spindle, a smaller threaded bore in communication with the larger bore, said body portion provided with threads on its rearward outer surface and having radial slots, undercut at their inner edges, the slots being inclined to the axis of the head, blades proportioned to fit within the slots having their inner edges inclined in complement to the inclination of the slots and provided with cut-outs at the junction of the inclined sides with the outer ends, ribs upon the inclined sides of the blades complementary to the cut-outs, a threaded plug seated in said threaded axial bore and provided with a radial flange seated within the cut-out and adapted to force the blades up the inclined slots, said plug having a socket adapted to receive the end of a wrench for effecting the motion of the blades, a ring nut threaded for engagement with the threads on the said rearward out surface of the body, and a collar around the body and positioned between the ring nut and the rearward extremities of the blades for the purpose set forth.

2. A reamer consisting of a body formed with a central opening enlarged at one end for a machine spindle and threaded at the other end, said body having inclined grooves with inset portions, blades having offset portions to fit said grooves and cut out at the front, a screw in said threaded opening having a flange of rectangular cross-section to fit in said cut-out spaces, a slidable ring rectangular in cross-section to engage the rear ends of the blades to fix them in place, and a nut engaging the rear side of the ring to lock the parts together, substantially as set forth.

In witness whereof, I have hereunto set my hand and seal at Waynesboro, Pennsylvania, this 27th day of March, A. D. nineteen hundred and nineteen.

CLARENCE G. CASHMAN. [L.S.]

Witnesses:
H. D. BOCK,
EDITH CASHMAN.